United States Patent
Yoshitani et al.

(10) Patent No.: US 9,777,828 B2
(45) Date of Patent: Oct. 3, 2017

(54) FLUID SUPPLY DEVICE

(71) Applicant: TBK CO., LTD., Machida-shi, Tokyo (JP)

(72) Inventors: Hirotada Yoshitani, Yamato (JP); Yoshiyuki Terada, Machida (JP)

(73) Assignee: TBK CO., LTD., Tokyo (JP)

( * ) Notice: Subject to any disclaimer, the term of this patent is extended or adjusted under 35 U.S.C. 154(b) by 0 days.

(21) Appl. No.: 14/651,802

(22) PCT Filed: Dec. 17, 2012

(86) PCT No.: PCT/JP2012/008051
§ 371 (c)(1),
(2) Date: Jun. 12, 2015

(87) PCT Pub. No.: WO2014/097345
PCT Pub. Date: Jun. 26, 2014

(65) Prior Publication Data
US 2015/0316144 A1  Nov. 5, 2015

(51) Int. Cl.
*F16H 61/00* (2006.01)
*F16H 57/04* (2010.01)
*F16H 59/68* (2006.01)

(52) U.S. Cl.
CPC ..... *F16H 61/0031* (2013.01); *F16H 57/0441* (2013.01); *F16H 61/0021* (2013.01);
(Continued)

(58) Field of Classification Search
None
See application file for complete search history.

(56) References Cited

U.S. PATENT DOCUMENTS

2006/0231057 A1  10/2006  Futamura et al.
2007/0240919 A1*  10/2007  Carlson .................. B60K 25/00
                                                                                  180/53.4
(Continued)

FOREIGN PATENT DOCUMENTS

CN  1754037 A  3/2006
CN  102059942 A  5/2011
(Continued)

OTHER PUBLICATIONS

International Search Report dated Mar. 19, 2013 issued in corresponding application No. PCT/JP2012/008051.
(Continued)

*Primary Examiner* — Colby M Hansen
(74) *Attorney, Agent, or Firm* — Westerman, Hattori, Daniels & Adrian, LLP

(57) ABSTRACT

An oil supply device comprises a main pump driven by an engine and capable of supplying oil to an automatic transmission and to a hydraulic control valve, an electric motor, a subsidiary pump driven by the electric motor that raises the pressure of a portion of the oil discharged from the main pump and supplies the oil to the hydraulic control valve, and a motor controller which controls driving of the electric motor on the basis of the pressure of the oil supplied to the automatic transmission. The motor controller implements control to drive the subsidiary pump by the electric motor to raise the pressure of a portion of the oil discharged from the main pump to a prescribed pressure or above and supply the oil to the hydraulic control valve when the pressure of the oil supplied to the automatic transmission is less than the prescribed pressure.

3 Claims, 3 Drawing Sheets

(52) U.S. Cl.
CPC .............. *F16H 2059/683* (2013.01); *F16H 2061/0037* (2013.01); *F16H 2061/0046* (2013.01)

(56) References Cited

U.S. PATENT DOCUMENTS

| | | |
|---|---|---|
| 2011/0107863 A1 | 5/2011 | Ren et al. |
| 2011/0120568 A1* | 5/2011 | Borntraeger ........ F16H 61/0031 137/14 |
| 2012/0085441 A1 | 4/2012 | Park et al. |

FOREIGN PATENT DOCUMENTS

| | | |
|---|---|---|
| EP | 2 441 985 A2 | 4/2012 |
| JP | 2005-30495 A | 2/2005 |
| JP | 2006-153041 A | 6/2006 |
| JP | 2008-180302 A | 8/2008 |
| JP | 2009-52639 A | 3/2009 |
| JP | 2009-287688 A | 12/2009 |
| JP | 2011-122627 A | 6/2011 |
| JP | 2012-82947 A | 4/2012 |
| WO | 2006/016797 A1 | 2/2006 |

OTHER PUBLICATIONS

Extended (supplementary) European Search Report dated Jul. 28, 2016, issued in counterpart Application No. 12890275.6. (7 pages).
Office Action dated May 4, 2016, issued in counterpart Chinese Application No. 201280077770.5, with English translation (14 pages).

* cited by examiner

FLUID SUPPLY DEVICE

TECHNICAL FIELD

The present invention relates to a fluid supply device which supplies fluid to a first supply target section where supply of fluid of an amount corresponding to driving of a drive source is required and a second supply target section where supply of a fluid at or above a prescribed pressure is required.

TECHNICAL BACKGROUND

Possible examples of a device which includes first and second supply target sections such as those described above include an automatic transmission configured by a torque converter, a transmission mechanism, and a hydraulic control valve which controls the operation of a brake and/or clutch that sets the transmission gear in a transmission mechanism. An example of an automatic transmission configured in this way is illustrated in FIG. 1 of Patent Document 1, for example, which discloses an automatic transmission for a hybrid vehicle constituted by a torque converter 6 having a lock-up clutch 5, an automatic transmission mechanism 7, a hydraulic control valve 12, and the like. An automatic transmission is provided with an oil pump that is driven by a drive source, and is configured so as to provide lubrication by supplying oil discharged from the oil pump to a transmission mechanism which is driven to rotate by a drive source, as well as controlling the operation of the hydraulic control valve by supplying the oil thereto.

PRIOR ARTS LIST

Patent Document

Patent Document 1: Japanese Patent Application Publication No. 2006-153041

SUMMARY OF THE INVENTION

Problems to be Solved by the Invention

Since the amount of heat generated by friction in the transmission mechanism increases, as the rotational speed thereof rises, then it is necessary to supply operating oil of an amount corresponding to the rotational speed, in order to achieve sufficient lubrication and cooling of the transmission mechanism. By supplying oil discharged from the oil pump driven by the drive source (engine) to the transmission mechanism, the transmission mechanism is driven to rotate by the drive source, and therefore oil (lubricating oil) of an amount corresponding to the rotational speed can be supplied, and this requirement can be satisfied. On the other hand, the hydraulic control valve also operates by receiving a supply of oil from the oil pump, but in order to control the operation of the hydraulic control valve, a hydraulic pressure equal to or greater than a prescribed pressure required to operate the valve is necessary. In this way, a supply of oil (lubricating oil) of an amount corresponding to the rotational speed of the drive source is necessary in the lubricating section of the transmission mechanism, whereas a supply of oil (lubricating oil) of a pressure required for valve operation is necessary in the hydraulic control valve.

In order to satisfy these different requirements, in the prior art, control is implemented to set the oil discharged from an oil pump driven by a prime mover, in other words, discharged oil of an amount corresponding to the rotational speed of the prime mover, to a prescribed pressure required for control of valve operation, by a pressure adjustment valve, for instance, and the oil at a prescribed pressure of which the pressure has been adjusted by the pressure adjustment valve in this way is supplied to the hydraulic control valve, as operating oil. The remainder of the oil apart from the amount of oil required in the hydraulic control valve (which is generally a very small amount) is supplied as lubricating oil to the transmission mechanism after passing through the pressure adjustment valve.

As can be seen here, in a prior art configuration, oil discharged from an oil pump driven by a prime mover is first adjusted to a prescribed pressure required for operation of the valve, by a pressure adjustment valve, or the like, and therefore a large torque is required to drive the oil pump by the prime mover (the torque required to generate the prescribed pressure), and a large motive power is necessary. More specifically, since the entire amount of the oil discharged from the oil pump driven by the prime mover needs to be adjusted to a prescribed pressure, despite the fact that the amount of operating oil required for the hydraulic control valve is very small, then there has been a problem in that the drive power of the prime mover becomes larger, in other words, there is a loss of the drive power from the prime mover. With regard to the supply pressure of the oil (lubricating oil) fed to the lubrication section of the transmission mechanism, the oil may be supplied directly to the lubrication section simply by the pressure generated by flow passage resistance of the lubrication section, without requiring pressure adjustment. The hydraulic pressure in this case generally rises in accordance with increase in the amount of supplied oil (in other words, in accordance with the rotational speed at which the oil pump is driven by the prime mover), but the pressure is normally low and the associated drive torque and motive power are also low.

In order to resolve the problem described above, it might be possible to make separate use of an oil pump for the supply of lubricating oil and an oil pump for the supply of operating oil to the hydraulic control valve, but since this configuration involves two oil pumps being driven at all times by the engine, there is a problem in that the device costs are high. Furthermore, the oil pump used for supplying operating oil to the hydraulic control valve discharges an amount of oil corresponding to the rotational speed of the drive source, and therefore operating oil of an amount corresponding to the rotational speed is supplied, despite the fact that the amount of oil actually required in the hydraulic control valve is very small, and hence there is a problem in that a corresponding loss of drive power occurs.

The present invention was devised in view of the circumstances described above, an object thereof being to provide a fluid supply device capable of supplying fluid so as to simultaneously satisfy different requirements relating to the supplied fluid (oil amount requirements and oil pressure requirements), while suppressing wasteful consumption of energy.

Means to Solve the Problems

In order to achieve the abovementioned object, the fluid supply device relating to the present invention (for example, the oil supply device 1 in the embodiment) is a fluid supply device for a drive mechanism (for example, the travel drive mechanism 2 in the embodiment) that includes a drive source (for example, the engine E in the embodiment), and a drive device (for example, the automatic transmission 3 in the embodiment) which is driven by the drive source and which includes a first supply target section (for example, the automatic transmission mechanism 6 in the embodiment) where supply of fluid of an amount corresponding to the driving of the drive source is required, and a second supply target section (for example, the hydraulic control valve 7 in the embodiment) where supply of fluid at a prescribed pressure or above is required, the fluid supply device supplying fluid to the first supply target section and the second supply target section, and including: a first supply pump (for example, the main pump 5 in the embodiment) which is driven by the drive source and is capable of supplying discharged fluid to the first supply target section, as well as to the second supply target section; an electric motor; a second supply pump (for example, the subsidiary pump 11 in the embodiment) which is driven by the electric motor and raises the pressure of a portion of the fluid discharged from the first supply pump and supplies the fluid to the second supply target section; and motor drive control means (for example, the motor controller 12 in the embodiment) for controlling driving of the electric motor on the basis of the pressure of the fluid discharged from the first supply pump and supplied to the first supply target section, wherein the motor drive control means is configured to implement control to: drive the second supply pump by the electric motor to raise the pressure of a portion of the fluid discharged from the first supply pump to the prescribed pressure or above by using the second supply pump, and supply the fluid to the second supply target section, when the pressure of the fluid discharged from the first supply pump and supplied to the first supply target section is less than the prescribed pressure; and stop the driving of the second supply pump by the electric motor, when the pressure of the fluid supplied to the first supply target section is equal to or greater than the prescribed pressure.

Desirably, the fluid supply device described above further includes a bypass supply passage (for example, the bypass oil passage 25 in the embodiment) by which fluid discharged from the first supply pump is supplied to the second supply target section by bypassing the second supply pump, and the bypass supply passage is provided with a check valve which permits a supply of the fluid discharged from the first supply pump to the second supply target section via the bypass supply passage, but restricts flow in the reverse direction thereof.

Desirably, the fluid supply device described above further includes a bypass supply passage by which fluid discharged from the first supply pump is supplied to the second supply target section by bypassing the second supply pump, the bypass supply passage is provided with flow passage opening and shutting means (for example, the open/shut valve in the embodiment) for opening and shutting the bypass supply passage, and the flow passage opening and shutting means is configured so as to shut the bypass supply passage when the electric motor is driven and so as to open the bypass supply passage when the electric motor is stopped.

Advantageous Effects of the Invention

The fluid supply device relating to the present invention is configured so as to implement control to raise the pressure of a portion of the fluid discharged from the first supply pump, by the second supply pump, and supply the fluid to the second supply target section, when the pressure of the fluid supplied to the first supply target section is less than the prescribed pressure, and to stop the driving of the second supply pump, when the pressure of the fluid supplied to the first supply target section is equal to or greater than the prescribed pressure. Therefore, only the amount of fluid required in the second supply target section needs to be raised to the prescribed pressure, by driving the second supply pump, when the discharge pressure of the fluid discharged from the first supply pump which is driven by the drive source is less than the prescribed pressure required in the second supply target section. Consequently, it is possible to satisfy the requirements of the supplied fluid in the second supply target section, while reducing loss of the drive power of the drive source, compared to a prior art configuration in which the entire amount of the discharged fluid is adjusted to the prescribed pressure, for example. Furthermore, in this case, since fluid of an amount corresponding to the driving of the drive source is discharged by driving the first supply pump by the drive source, then it is possible to satisfy the requirements of the supplied fluid in the first supply target section, if the fluid discharged from the first supply pump is supplied directly to the first supply target section from the first supply pump.

Desirably, in the fluid supply device described above, a check valve which permits a supply of fluid discharged from the first supply pump to the second supply target section via the bypass supply passage, but which restricts flow in the reverse direction thereof, is provided in the bypass supply passage which supplies fluid to the second supply target section by bypassing the second supply pump. According to this configuration, if the driving of the second supply pump is stopped when fluid at or above the prescribed pressure is discharged from the first supply pump, then it is possible automatically to supply fluid at or above the prescribed pressure to the second supply target section via the bypass supply passage.

Desirably, in the fluid supply device described above, fluid passage opening and shutting means for shutting the bypass supply passage when the electric motor is driven and opening the bypass supply passage when the electric motor is stopped is provided in the bypass supply passage which supplies fluid to the second supply target section by bypassing the second supply pump. In the case of this configuration, the bypass supply passage is shut by the flow passage opening and shutting means, when fluid at less than the prescribed pressure is discharged from the first supply pump and the electric motor is driven, and therefore it is possible to supply fluid which has been raised to the prescribed pressure by the second supply pump, to the second supply target section. On the other hand, the bypass supply passage is opened by the fluid opening and shutting means when fluid at or above the prescribed pressure is discharged from the first supply pump and the electric motor is stopped, and therefore it is possible to supply fluid at or above the prescribed pressure to the second supply target section by bypassing the bypass supply passage. Furthermore, since the second supply pump needs only to raise the pressure by the pressure differential between the discharge pressure of the first supply pump and the prescribed pressure, then it is possible to reduce the size of the second supply pump and to restrict the energy consumption of the second supply pump, compared to a configuration in which, for example, the fluid is supplied to the second supply target section by being raised to the prescribed pressure by the second supply pump only.

DESCRIPTION OF THE EMBODIMENTS

Figure 1:
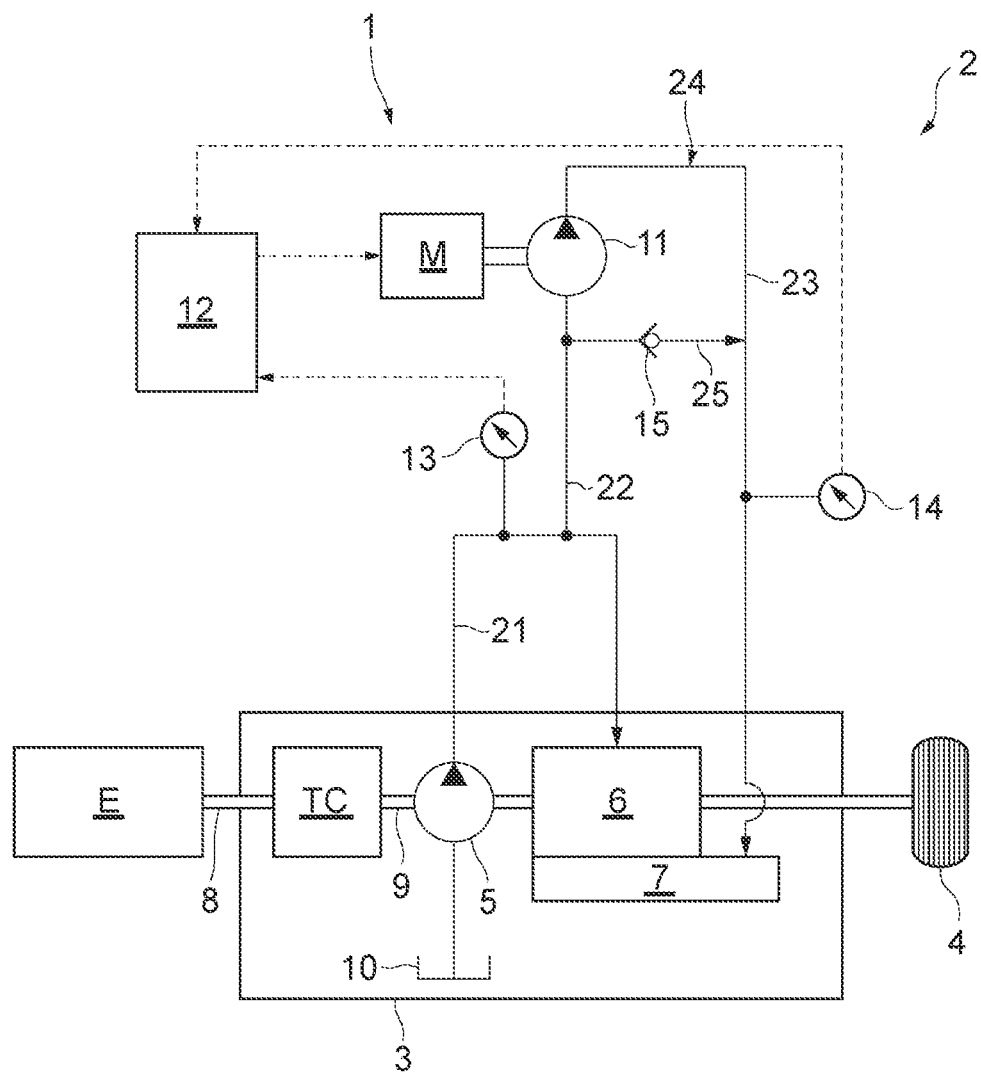
FIG. 1 is a block diagram showing a travel drive mechanism constituted by an oil supply device relating to the present invention.

Embodiments of this invention are described below with reference to the drawings. FIG. 1 shows a block diagram of a travel drive mechanism 2 to which oil is supplied by an oil supply device 1 relating to the present invention, and the configuration of the travel drive mechanism 2 is described firstly, with reference to FIG. 1.

The travel drive mechanism 2 is constituted by an engine E which forms a drive source, an automatic transmission 3 which changes the speed of, and outputs, an input rotary drive force of the engine E, and travel wheels 3 to which the rotary drive force output from the automatic transmission 3 is transmitted.

The automatic transmission 3 is constituted by a torque converter TC which is connected to an output shaft 8 of the engine E and to which the rotary drive force of the engine E is input, a main pump 5 which is disposed on an output shaft 9 of the torque converter TC, an automatic transmission mechanism 6 which is connected to the output shaft 9 of the torque converter TC, and a hydraulic control valve 7 which controls the operation of the automatic transmission mechanism 6.

The torque converter TC is configured by, for example, arranging a turbine runner (not illustrated) and a pump impeller (not illustrated) in mutually facing arrangement, sandwiching a stator (not illustrated) therebetween, and filling with oil. The output shaft 8 of the engine E is connected to a pump impeller, and this pump impeller is driven to rotate by the engine E and creates a flow of the oil. The inertial force of this oil acts on the turbine runner to which the output shaft 9 of the torque converter TC is connected, and the output shaft 9 is driven to rotate. Instead of this torque converter TC, it is also possible to use a clutch mechanism.

The automatic transmission mechanism 6 is a geared transmission mechanism provided with a plurality of transmission gear trains constituted by planetary gear mechanisms; the operation of a clutch (not illustrated) and/or brake (not illustrated) for controlling transmission is controlled by the hydraulic control valve 7, and automatic transmission is performed by setting the transmission gear automatically.

The hydraulic control valve 7 receives a supply of operating oil (operating oil pressure) and operates by using the pressing force generated by this operating oil pressure. The hydraulic control valve 7 controls the operation of the clutch and/or brake, etc. which constitute the automatic transmission mechanism 6. Since the hydraulic control valve 7 is configured so as to operate by using the pressing force generating by the operating oil pressure, it is necessary to generate a pressing force sufficient to cause the hydraulic control valve 7 to operate. Therefore, it is necessary to supply a hydraulic pressure sufficient to generate the pressing force required in accordance with the configuration of the hydraulic control valve 7, in other words, operating oil at or above a prescribed pressure corresponding to this pressing force.

Thus far, the configuration of the travel drive mechanism 2 has been explained. According to this travel drive mechanism 2, the vehicle travels due to rotary drive force from the engine E being changed in speed by the automatic transmission mechanism 6 and being transmitted to the drive wheels 3, in a state where the automatic transmission mechanism 6 has been set automatically to a desired gear corresponding to the driving state. In this way, in an automatic transmission 3 which changes the speed of the rotary drive force of the engine E and transmits the drive force to the drive wheels 3, it is necessary to supply lubricating oil to the portions which have mutually different speeds of rotation and perform sliding contact, and to the bearing portions, in such a manner that rotational movement is transmitted smoothly. Furthermore, since frictional heat is generated in the clutch and brake portions in particular, in accordance with the rotational speed, then it is necessary to lubricate and cool the automatic transmission mechanism 6. The amount of lubricating oil required in this case is an amount corresponding to the rotational speed. Furthermore, in order to control the operation of the clutch and/or brake which constitute the automatic transmission mechanism 6 as described above, it is also necessary to supply operating oil at or above a prescribed pressure, to the hydraulic control valve 7.

Therefore, an oil supply device 1 is provided, which supplies oil for lubrication and cooling to the portions where a supply of lubricating oil is necessary in the automatic transmission mechanism 6 (called the "lubrication target sections" below), and also supplies operating oil to the hydraulic control valve 7 in order to operate the valve. The configuration of the oil supply device 1 is described below with reference to FIG. 1.

The oil supply device 1 is constituted by the main pump 5 described above, a main supply passage 21 which links the main pump 5 with the lubrication target section in the automatic transmission mechanism 6, a subsidiary supply passage 24 which branches from an intermediate part of the main supply passage 21 and links to the hydraulic control valve 7, a subsidiary pump 11 which is disposed in the subsidiary supply passage 24, an electric motor M which drives the subsidiary pump 11, and a motor controller 12 which controls the driving of the electric motor M. The subsidiary supply passage 24 is constituted by an upstream-side subsidiary supply passage 22 linking the main supply passage 21 and the subsidiary pump 11, and a downstream-side subsidiary supply passage 23 linking the subsidiary pump 11 and the hydraulic control valve 7.

The main pump 5 is constituted, for example, by a fixed displacement type of external gear pump configured by a pair of gears arranged rotatably in an enmeshed state inside a casing. Therefore, the main pump 5 takes in oil which has collected in an oil pan 10 and discharges the oil to the main supply passage 21, when driven to rotate by receiving the transmission of rotary drive force from the engine E via the torque converter TC.

The subsidiary pump 11 is constituted by a fixed displacement type of external gear pump, for example, and when the subsidiary pump 11 is driven to rotate by the electric motor M, a portion of the oil in the main supply passage 21 is taken up into the subsidiary pump 11 via the upstream-side subsidiary supply passage 22, the pressure thereof is raised in the downstream-side subsidiary supply passage 23 and the oil is discharged.

A main-side pressure detector 13, which detects the pressure PM of the oil (lubricating oil) that is discharged into the main supply passage 21 by the main pump 5 and is supplied to the lubrication target section in the automatic transmission mechanism 6, is provided in the main supply passage 21, and a signal indicating the value of the pressure PM detected by this main-side pressure detector 13 is output to the motor controller 12. Furthermore, a subsidiary-side pressure detector 14 which detects the pressure PS of the oil supplied to the hydraulic control valve 7 from the downstream-side supply passage 23 is provided in the downstream-side subsidiary supply passage 23, and a signal indicating the value of the pressure PS detected by this subsidiary-side pressure detector 14 is output to the motor controller 12. The motor controller 12 previously stores the operating oil pressure (prescribed pressure) required in order to operate the hydraulic control valve 7, and controls the supply of power to the electric motor M (see details below), on the basis of the results input from the main-side pressure detector 13 and the subsidiary-side pressure detector 14 (pressure PM and pressure PS).

A bypass oil passage 25 provided with a check valve 15 is provided between the upstream-side subsidiary supply passage 22 and the downstream-side subsidiary supply passage 23. The check valve 15 is a valve which regulates the flow of oil from the downstream-side subsidiary supply passage 23 to the upstream-side subsidiary supply passage 22, passing via the bypass oil passage 25, and permits a flow of oil in the reverse direction to this. Therefore, when the pressure of the upstream-side subsidiary supply passage 22 is higher than the downstream-side subsidiary supply passage 23, the check valve 15 opens and permits a supply of oil from the upstream-side subsidiary supply passage 22 to the downstream-side subsidiary supply passage 23, via the bypass oil passage 25. When, conversely, the pressure in the downstream-side subsidiary supply passage 23 is higher than the upstream-side subsidiary supply passage 22, the check valve 15 shuts and the flow of oil via the bypass oil passage 25 is restricted.

Figure 2:
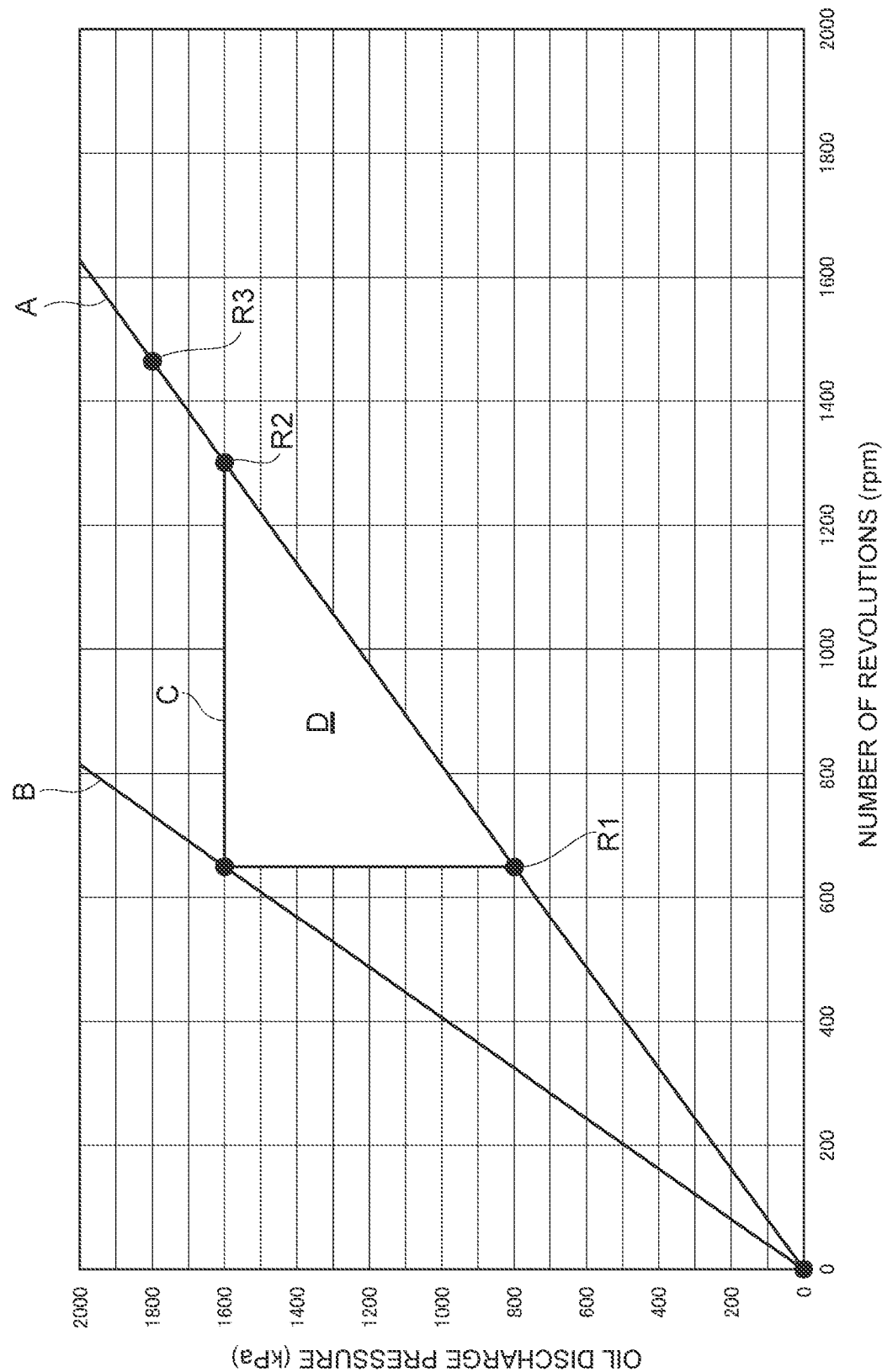
FIG. 2 is a graph showing the characteristics of a main pump which constitutes an oil supply device.

The configuration of oil supply device 1 has been explained above. Before describing the operation of the oil supply device 1, a brief explanation of a prior art oil supply device will be given with reference to FIG. 2. FIG. 2 illustrates a case where the prescribed pressure of the operating oil that is capable of operating the hydraulic control valve 7 is approximately 1600 kPa.

A prior art oil supply device is configured so as to adjust the oil discharged from an oil pump to a prescribed pressure (approximately 1600 kPa) by using a pressure adjustment valve and supplying the oil to a hydraulic control valve, as operating oil, as well as supplying oil passing through the pressure adjustment valve to a transmission mechanism, as lubricating oil. Consequently, the entire amount of the oil discharged from the oil pump is adjusted to a prescribed pressure, despite the fact the amount of oil required in the hydraulic control valve is very small, and hence there is a problem in that the motive power of the engine is used wastefully. More specifically, when the number of revolutions of the engine increases from a state of idle rotation, the amount of oil discharged from the oil pump rises in accordance with the increase in the number of revolutions of the engine, but the entire amount of the discharged oil is adjusted to a pressure of approximately 1600 kPa by the pressure adjustment valve. Therefore, the amount of discharged oil increases while the oil discharge pressure remains at approximately 1600 kPa, until the number of revolutions reaches point R2 and the oil discharge pressure reaches approximately 1600 kPa (see line C). When the number of revolutions of the oil pump has increased to point R2 or above, then the pressure of the lubricating oil exceeds 1600 kPa, and therefore the discharged oil also assumes this pressure and the oil discharge pressure increases as indicated by graph A. It is also possible to use an oil pump having the characteristics indicated in graph B, instead of using a pressure adjustment valve, but in this case, even more wasteful use of the engine motive force occurs.

A prior art oil supply device has been described above. Next, returning to the embodiment of the present invention, the characteristics of the main pump 5 will be described with reference to FIG. 2. In FIG. 2, the characteristics of the main pump 5 (the relationship between the number of revolutions and the discharge pressure of the oil) is indicated by the graph A. When the oil discharged from the main pump 5 is supplied to the automatic transmission mechanism 6, the supply pressure (lubricating oil pressure) increases in accordance with increase in the rotational speed of the engine E, in other words, increase in the amount of oil supplied, due to the flow passage resistance in the lubrication target section of the automatic transmission mechanism 6, and therefore the supply pressure changes as indicated by graph A.

As FIG. 2 reveals, the oil discharge pressure of the main pump 5 is equal to or greater than 1600 kPa when the number of revolutions is at point R2 or higher, and consequently the prescribed pressure can be guaranteed even when the oil discharged from the main pump 5 is supplied directly to the hydraulic control valve 7 in this range of the number of revolutions, and hence there is no problem. However, in the number of revolutions range between point R1 and point R2, the oil discharge pressure from the main pump 5 is lower than the prescribed pressure, and therefore when the oil discharged from the main pump 5 is supplied directly to the hydraulic control valve 7, problems occur in the operation of the hydraulic control valve 7.

Therefore, in the oil supply device 1 relating to the present invention, in the number of revolutions range between point R1 and point R2 (the range where the oil discharge pressure is equal to or lower than the prescribed pressure), control is implemented to drive the subsidiary pump 11 by the electric motor M and thereby raise the pressure of the operating oil supplied to the hydraulic control valve 7, to a prescribed pressure (approximately 1600 kPa). In this case, since the amount of operating oil required for operation of the hydraulic control valve 7 is small, then the amount of driving rotation of the electric motor M is small and the drive power thereof is also small. Moreover, since the pressure of the lubricating oil discharged from the main pump 5 and supplied to the lubrication target section of the automatic transmission mechanism 6 is raised only by the pressure differential with respect to the prescribed pressure, by the electric motor M, then the drive power of the motor may be even smaller. On the other hand, since the discharge pressure of the oil from the main pump 5 changes depending on the number of revolutions, as indicated by graph A, then loss of the drive power of the engine E, which corresponds to the triangular portion D in FIG. 2, can be prevented in comparison with the oil supply device of the prior art configuration described above, and the fuel efficiency of the engine E can be improved.

The characteristics of the main pump 5 have been described above. Next, the operation of the oil supply device 1 will be described separately in relation to cases where the main pump 5 is driven to rotate, respectively, at a number of revolutions at point R1 (when the engine E is idling), at a number of revolutions between point R1 and point R2, at a number of revolutions at point R2, and at a number of revolutions at point R3.

Firstly, a case where the main pump 5 is driven to rotate at a number of revolutions at point R1 will be described. When the main pump 5 is driven to rotate at the number of revolutions at point R1, oil collected in the oil pan 10 is taken up, discharged into the main supply passage 21 and supplied to the automatic transmission mechanism 6, at an oil discharge pressure and oil discharge amount corresponding to the number of revolutions at that time. In this case, the amount of lubricating oil supplied to the lubrication target section of the automatic transmission mechanism 6 via the main supply passage 21 corresponds to the number of revolutions of the engine E, and consequently there is no problem with lubrication of the automatic transmission mechanism 6. On the other hand, the hydraulic control valve 7 requires the supply of operating oil at or above a prescribed pressure in order to operate the valve. However, when the main pump 5 is driven to rotate at the number of revolutions at point R1, the discharge pressure of the oil discharged from the main pump 5 is approximately 800 kPa, which does not meet the prescribed pressure, and therefore, it is difficult to operate the hydraulic control valve if the oil discharged from the main pump 5 is supplied directly to the hydraulic control valve 7.

Therefore, in cases such as this, control such as the following is implemented by the motor controller 12. As described above, the motor controller 12 receives input of a signal indicating the value of the pressure PM of the main supply passage 21 from the main-side pressure detector 13. The motor controller 12 compares the pressure PM corresponding to the input signal with a prescribed pressure that has been stored previously, and when the pressure PM is less than the prescribed pressure, applies power supply control to the electric motor M in such a manner that oil is discharged from the subsidiary pump 11 to the downstream-side subsidiary supply passage 23, and when the pressure PM is equal to or greater than the prescribed pressure, applies power supply control so as to halt the rotary driving of the electric motor M. This is because, when oil is discharged at less than the prescribed pressure from the main pump 5, it is difficult to operate the hydraulic control valve, even if the discharged oil is supplied directly to the hydraulic control valve 7, but when oil is discharged at or above the prescribed pressure from the main pump 5, then the hydraulic control valve can be operated if this discharged oil is supplied directly (without being raised in pressure) to the hydraulic control valve 7. When the main pump 5 is driven to rotate at a number of revolutions at point R1, since the pressure PM is less than the prescribed pressure, the motor controller 12 applies power supply control to the electric motor M in such a manner that oil is discharged from the subsidiary pump 11 to the downstream-side subsidiary supply passage 23.

Consequently, although the pressure inside the downstream-side subsidiary supply passage 23 rises, the motor controller 12 also receives input of a signal indicating the value of the pressure PS in the downstream-side subsidiary supply passage 23 from the subsidiary-side pressure detector 14, as described above, and the pressure PS in the downstream-side subsidiary supply passage 23 is detected on the basis of this input signal. The motor controller 12 applies power supply control to the electric motor M in such a manner that the pressure PS of the downstream-side subsidiary supply passage 23 becomes the prescribed pressure, on the basis of the signal input from the subsidiary-side pressure detector 14. When the pressure PS in the downstream-side subsidiary supply passage 23 has been raised to the prescribed pressure, the motor controller 12 applies power supply control to the electric motor M in such a manner that the pressure PS is maintained at the prescribed pressure.

Here, a brief description is given of a concrete example of power supply control for maintaining the pressure PS at a prescribed pressure. When, for example, the pressure PS in the downstream-side subsidiary supply passage 23 rises and approaches the prescribed pressure, then as the differential between the prescribed pressure and the pressure PS in the downstream-side subsidiary flow passage 23 becomes smaller, power supply control is implemented to lower the number of revolutions of the electric motor M or to lower the drive torque (thereby reducing the pressure increase produced by the subsidiary pump 11). Furthermore, when the pressure PS in the downstream-side subsidiary supply passage 23 rises exceeding the prescribed pressure, then as the differential between the prescribed pressure and the pressure PS in the downstream-side subsidiary flow passage 23 becomes larger, power supply control is implemented to lower the number of revolutions of the electric motor M or to lower the drive torque. Even if the pressure PS in the downstream-side subsidiary supply passage 23 fluctuates, the pressure PS is rapidly maintained at the prescribed pressure, by this kind of power supply control which is applied to the electric motor M. The motor controller 12 detects a signal from the main-side pressure detector 13 and the subsidiary-side pressure detector 14, at short time intervals (for example, 10 ms), and applies the power supply control to the electric motor M described above on the basis of the detection result.

If rotational driving control of the subsidiary pump 11 is implemented as described above, a portion of the oil in the main supply passage 21 is taken into the subsidiary pump 11 via the upstream-side subsidiary supply passage 22, the oil thus taken in is discharged to the downstream-side subsidiary supply passage 23, and the pressure PS in the downstream-side subsidiary supply passage 23 is raised to a prescribed pressure. In this way, when the operating oil which has been raised to the prescribed pressure is supplied to the hydraulic control valve 7, it is possible to operate the hydraulic control valve by using the operating oil at this prescribed pressure. When the main pump 5 is driven to rotate at the number of revolutions at point R1, then the check valve 15 is shut, and the supply of oil from the upstream-side subsidiary supply passage 22 to the downstream-side subsidiary supply passage 23 via the bypass oil passage 25 is restricted.

Next, a case where the main pump 5 is driven to rotate at a number of revolutions between point R1 and point R2 will be described. In this case also, the discharge pressure of the oil discharged from the main pump 5 does not reach the prescribed pressure, and therefore the motor controller 12 implements power supply control similarly to a case where the main pump 5 is driven to rotate at the number of revolutions at point R1 described above. In other words, the motor controller 12 applies power supply control to the electric motor M in such a manner that oil is discharged from the subsidiary pump 11 to the downstream-side subsidiary supply passage 23. Consequently, although the pressure inside the downstream-side subsidiary supply passage 23 rises, the motor controller 12 also receives input of a signal indicating the value of the pressure PS in the downstream-side subsidiary supply passage 23 from the subsidiary-side pressure detector 14, as described above, and applies power supply control to the electric motor M in such a manner that the pressure PS of the downstream-side subsidiary supply passage 23 becomes the prescribed pressure. When the pressure PS in the downstream-side subsidiary supply passage 23 has been raised to the prescribed pressure, the motor controller 12 applies power supply control to the electric motor M in such a manner that the pressure PS is maintained at the prescribed pressure.

Next, a case where the main pump 5 is driven to rotate at a number of revolutions at point R2 will be described. When the main pump 5 is driven to rotate at the number of revolutions at point R2, oil collected in the oil pan 10 is taken up, discharged into the main supply passage 21 and supplied to the automatic transmission mechanism 6, at an oil discharge pressure and oil discharge amount corresponding to the number of revolutions at that time. In this case, the amount of lubricating oil supplied to the automatic transmission mechanism 6 via the main supply passage 21 corresponds to the number of revolutions of the engine E, and consequently there is no problem with lubrication of the automatic transmission mechanism 6. On the other hand, the hydraulic control valve 7 requires the supply of operating oil at or above a prescribed pressure in order to operate the valve. However, when the main pump 5 is driven to rotate at the number of revolutions at point R2, the discharge pressure of the oil discharged from the main pump 5 reaches the prescribed pressure, and therefore the hydraulic control valve can be operated if the oil discharged from the main pump 5 is supplied directly to the hydraulic control valve 7.

In this case, the motor controller 12 compares the prescribed pressure with the pressure PM corresponding to the input signal from the main-side pressure detector 13, and determines that the pressure PM is equal to or greater than the prescribed pressure. When this determination is made, the motor controller 12 implements power supply control so as to halt the driving of the electric motor M. In this case, both the upstream-side subsidiary supply passage 22 and the downstream-side subsidiary supply passage 23 assume the prescribed pressure, and the check valve 15 opens and permits a supply of operating oil from the upstream-side subsidiary supply passage 22 to the downstream-side subsidiary supply passage 23, via the bypass oil passage 25. Therefore, a portion of the oil at the prescribed pressure which is discharged from the main pump 5 to the main supply passage 21 is supplied to the hydraulic control valve 7 via the upstream-side subsidiary supply passage 22, the bypass oil passage 25 and the downstream-side subsidiary supply passage 23, and therefore it is possible to operate the hydraulic control valve by using the operating oil at this prescribed pressure.

When control is implemented in such a manner that an electric motor M is driven to rotate until the pressure PM increases and reaches a prescribed pressure, and the electric motor M is stopped when the pressure PM falls and reaches the same prescribed pressure, then there is a risk that the electric motor M will become instable and repeat rotational driving and stopping ("hunting"), if the main pump 5 is driven to rotate at a number of revolutions close to point R2. Therefore, in cases such as this, hysteresis is incorporated and control is implemented so that the electric motor M is driven to rotate until, for example, the pressure PM rises and reaches the prescribed pressure, whereas the electric motor M is stopped until the pressure PM falls and reaches a pressure lower than the prescribed pressure (for example, 1550 kPa), and when the pressure PM becomes lower than this pressure lower than the prescribed pressure, the electric motor M is driven to rotate.

Next, a case where the main pump 5 is driven to rotate at a number of revolutions at point R3 will be described. When the main pump 5 is driven to rotate at the number of revolutions at point R3, oil collected in the oil pan 10 is taken up, discharged into the main supply passage 21 and supplied to the automatic transmission mechanism 6, at an oil discharge pressure and oil discharge amount corresponding to the number of revolutions at that time. In this case, the amount of lubricating oil supplied to the automatic transmission mechanism 6 via the main supply passage 21 corresponds to the number of revolutions of the engine E, and consequently there is no problem with lubrication of the automatic transmission mechanism 6. On the other hand, the hydraulic control valve 7 requires the supply of operating oil at or above a prescribed pressure in order to operate the hydraulic control valve. However, when the main pump 5 is driven to rotate at the number of revolutions at point R3, the discharge pressure of the oil discharged from the main pump 5 exceeds the prescribed pressure, and therefore the hydraulic control valve can be operated if the oil discharged from the main pump 5 is supplied directly to the hydraulic control valve 7.

In this case, the motor controller 12 compares the prescribed pressure with the pressure PM corresponding to the input signal from the main-side pressure detector 13, and determines that the pressure PM is equal to or greater than the prescribed pressure. When this determination is made, the motor controller 12 implements power supply control so as to halt the driving of the electric motor M. In this case, the pressure in the upstream-side subsidiary supply passage 22 exceeds the pressure in the downstream-side subsidiary supply passage 23, and therefore the check valve 15 opens and permits a supply of operating oil from the upstream-side subsidiary supply passage 22 to the downstream-side subsidiary supply passage 23, via the bypass oil passage 25. Therefore, a portion of the oil at the prescribed pressure which is discharged from the main pump 5 to the main supply passage 21 is supplied to the hydraulic control valve 7 via the upstream-side subsidiary supply passage 22, the bypass oil passage 25 and the downstream-side subsidiary supply passage 23, and therefore it is possible to operate the hydraulic control valve by using the operating oil at this prescribed pressure.

The operation of the oil supply device 1 which has been described above can be summarized as follows. More specifically, when the number of revolutions of the main pump 5 changes in accordance with the number of revolutions of the engine E, the discharge pressure of the oil from the main pump 5 changes, but drive control is applied to the electric motor M on the basis of the signal from the main-side pressure detector 13, as described above. In this case, when the discharge pressure of the oil from the main pump 5 does not meet the prescribed pressure, control is implemented to drive rotation of the electric motor M, whereas when the discharge pressure is equal to or greater than the prescribed pressure, control is implemented to stop the electric motor M. In the control for driving rotation of the electric motor M, the motor controller 12 raises the pressure PS of the downstream-side subsidiary supply passage 23 so as to become the prescribed pressure, on the basis of the signal input from the subsidiary-side pressure detector 14, and then applies power supply control to the electric motor M so as to maintain this prescribed pressure.

The embodiment described above relates to an example in which driving of the electric motor M is controlled on the basis of results detected by a main-side pressure detector 13 and a subsidiary-side pressure detector 14, but it is also possible to control driving of the electric motor M by using only a subsidiary-side pressure detector 14 and omitting the main-side pressure detector 13, for example. In the case of this configuration, the motor controller 12 controls the driving of the electric motor M in such a manner that the pressure PS detected by the subsidiary-side pressure detector 14 is maintained at or above the prescribed pressure.

Figure 3:
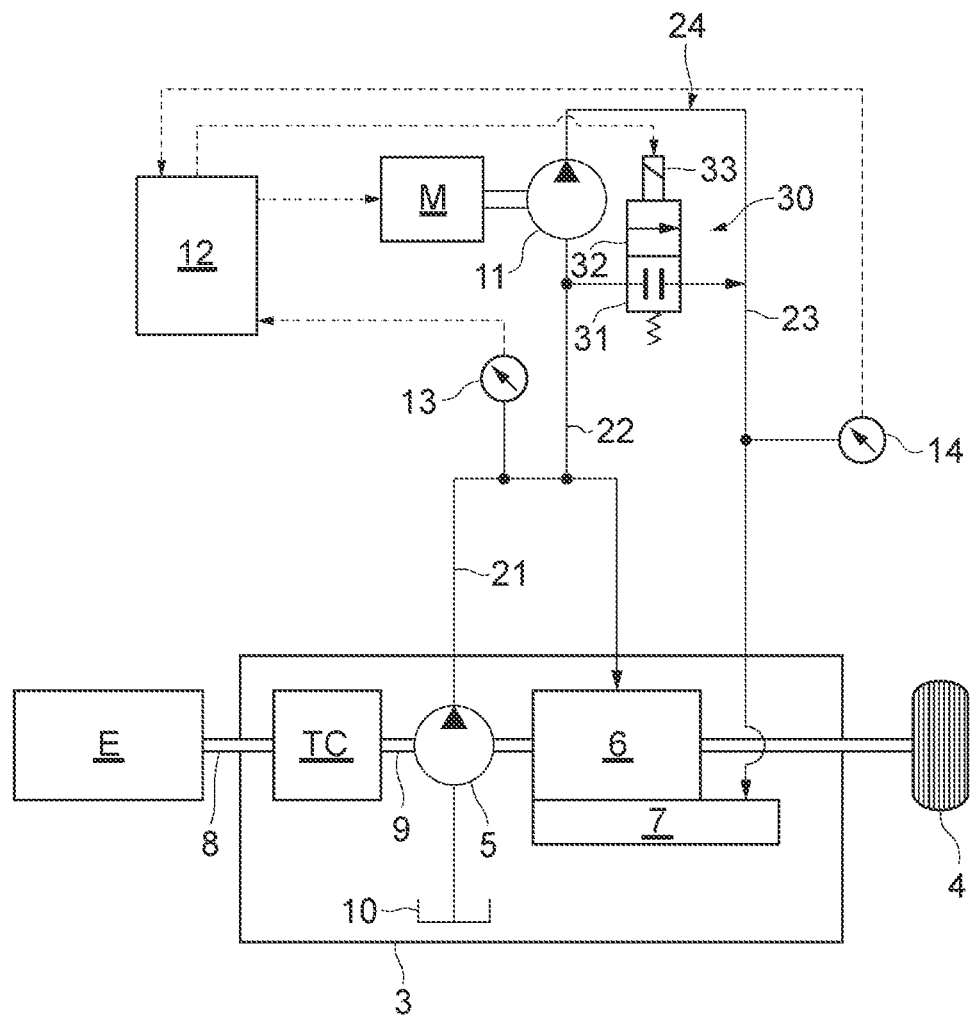
FIG. 3 is a block diagram showing a travel drive mechanism constituted by an oil supply device relating to a modification.

The embodiment described above relates to an example in which a check valve 15 is disposed in the bypass oil passage 25, but it is also possible to use an open/shut valve 30 configured so as to be switchable between a shut position 31 and an open position 32, instead of the check valve 15, as shown in FIG. 3, for example. An operation signal from the motor controller 12 is input to a solenoid 33 provided on the open position 32 side of the open/shut valve 30, and switching of the valve between the shut position 31 and the open position 32 is controlled on the basis of this operation signal. To describe the control of the switching of the open/shut valve 30, the motor controller 12 outputs an operation signal to position the open/shut valve 30 at the shut position 31 when driving the electric motor M. Consequently, after shutting the bypass oil passage 25, operating oil which has been raised to the prescribed pressure by the subsidiary pump 11 is supplied to the hydraulic control valve 7. On the other hand, the motor controller 12 outputs an operation signal to position the open/shut valve 30 at the open position 32 when the electric motor M is stopped. Consequently, the bypass oil passage 25 is opened, and oil (operating oil) at or above the prescribed pressure which has been discharged from the main pump 5 is supplied to the hydraulic control valve 7 via the bypass oil passage 25.

The embodiment described above relates to an example in which external gear pumps are used for the main pump 5 and the subsidiary pump 11, but it is also possible to use fluid pumps other than an external gear pump, such as a vane pump, internal gear pump, trochoid pump, or the like, for example. Furthermore, the embodiment described above relates to an example in which a fixed displacement type of pump is used, but it is also possible to use a variable displacement type of pump.

The embodiment described above relates to an example in which the oil supply device 1 relating to the present invention is applied to an automatic transmission 3, but the oil supply device 1 is not limited to this application and can also be applied to power transmission devices in general (for example, manual transmission devices for vehicles), which are constituted by portions that require an amount of oil for lubrication and cooling, and portions that require a prescribed oil pressure or above in order to operate a valve.

The embodiment described above relates to an example in which the oil supply device 1 relating to the present invention is applied to a travel drive mechanism 2 which is provided with an engine E as a drive source, but the oil supply device 1 relating to the present invention can also be applied to a travel drive mechanism which is provided with an electric motor as a drive source, for example.

The embodiment described above relates to an automatic transmission mechanism 6 constituted by a plurality of transmission gear trains configured by planetary gear mechanisms, but the oil supply device 1 can also be applied to an automatic transmission constituted by a belt type step-less transmission configured by a belt wrapped between a pair of sheaves, for example. Furthermore, the oil supply device 1 can also be applied to an automatic transmission constituted by a parallel shaft type of automatic transmission mechanism.

EXPLANATION OF NUMERALS AND CHARACTERS 1 oil supply device (fluid supply device)
2 travel drive mechanism (drive mechanism)
3 automatic transmission (drive device)
5 main pump (first supply pump)
6 automatic transmission mechanism (first supply target section)
7 hydraulic control valve (second supply target section)
11 subsidiary pump (second supply pump)
12 motor controller (motor drive control means)
15 check valve
25 bypass oil passage (detour supply passage)
30 open/shut valve (flow passage opening and shutting means)
E engine (drive source)
M electric motor

The invention claimed is:

1. A fluid supply device for a drive mechanism that includes a drive source, and a drive device which is driven by the drive source and which includes a first supply target section where supply of fluid of an amount corresponding to the driving of the drive source is required, and a second supply target section where supply of fluid at a prescribed pressure or above is required, the fluid supply device supplying fluid to the first supply target section and the second supply target section, and comprising:
   a first supply pump which is driven by the drive source and is capable of supplying discharged fluid to the first supply target section, as well as to the second supply target section;
   an electric motor;
   a second supply pump which is driven by the electric motor and raises the pressure of a portion of the fluid discharged from the first supply pump and supplies the fluid to the second supply target section; and
   motor drive control means for controlling driving of the electric motor on the basis of the pressure of the fluid discharged from the first supply pump and supplied to the first supply target section,
   wherein the motor drive control means is configured to implement control to:
   drive the second supply pump by the electric motor to raise the pressure of a portion of the fluid discharged from the first supply pump to the prescribed pressure or above by using the second supply pump, and supply the fluid to the second supply target section, when the pressure of the fluid discharged from the first supply pump and supplied to the first supply target section is less than the prescribed pressure;
   stop the driving of the second supply pump by the electric motor, when the pressure of the fluid supplied to the first supply target section is equal to or greater than the prescribed pressure; and
   store the prescribed pressure, and
   wherein the fluid in a tank is sucked by the first supply pump, and the fluid discharged by the first supply pump is sucked by the second supply pump.

2. The fluid supply device according to claim 1, further comprising a bypass supply passage by which fluid discharged from the first supply pump is supplied to the second supply target section by bypassing the second supply pump,
   wherein the bypass supply passage is provided with a check valve which permits a supply of the fluid discharged from the first supply pump to the second supply target section via the bypass supply passage, but restricts flow in the reverse direction thereof.

3. The fluid supply device according to claim 1, further comprising a bypass supply passage by which fluid discharged from the first supply pump is supplied to the second supply target section by bypassing the second supply pump, wherein the bypass supply passage is provided with flow passage opening and shutting means for opening and shutting the bypass supply passage, and
the flow passage opening and shutting means is configured so as to shut the bypass supply passage when the electric motor is driven and so as to open the bypass supply passage when the electric motor is stopped.

\* \* \* \* \*